Patented Apr. 3, 1945

2,372,861

UNITED STATES PATENT OFFICE 2,372,861

DERIVATIVES OF 2,4-OXAZOLIDINEDIONE

Roger W. Stoughton, Nashville, Tenn., assignor to Mallinckrodt Chemical Works, St. Louis, Mo., a corporation of Missouri No Drawing. Application March 10, 1941, Serial No. 382,582

6 Claims. (Cl. 269—307)

This invention relates to new derivatives of 2,4-oxazolidinedione, and with regard to certain more specific features, to such derivatives which represent substitutions in the 5-position, by two aryl radicals.

This application is a continuation-in-part of my copending application Serial No. 318,321, filed February 10, 1940.

Among the several objects of this invention may be noted the provision of new chemical compounds which are 5-substituted derivatives of 2,4-oxazolidinedione, and their alkali and alkaline earth metal salts, useful as anticonvulsants. Other objects will be in part obvious and in part pointed out hereinafter.

The invention accordingly comprises the ingredients and combinations of ingredients, the proportions thereof, steps and sequence of steps, and features of composition and synthesis, analysis, or metathesis, which will be exemplified in the products and processes hereinafter described, and the scope of the application of which will be indicated in the following claims.

The compounds included in this invention may be represented by the following type formula:

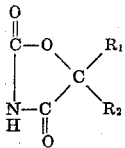

in which $R_1$ and $R_2$ are the same or different aryl radicals.

Throughout the specification and claims, where the term aryl appears, it will be understood that substituted aryl radicals are included.

The following example typifies the compounds included in the present invention. It is exemplary only.

5,5-diphenyl-2,4-oxazolidinedione was prepared as follows: To a solution of metallic sodium (5.8 g.) in absolute alcohol (120 ml.) was added: urea (15 g.) and 0.25 mole of ethyl benzilate. This mixture was refluxed for from fifteen to twenty hours, and then as much alcohol as possible was distilled off under reduced pressure. The gummy residue was cooled and dissolved in ice water (300 ml.). This solution was extracted twice with 100 ml. portions of ether, and the crude oxazolidinedione precipitated by acidification in the cold with hydrochloric acid. The product crystallized from dilute methanol as fine colorless needles. It was 5,5-diphenyl-2,4-oxazolidinedione (M. P. 135–136° C.). It was soluble in alcohol, ether, acetone and benzene, but insoluble in water and petroleum ether. The yield was 70 to 90% of the theoretical.

5,5-diphenyl-2,4-oxazolidinedione behaves as a weak mono-basic acid, and forms alkali and alkaline earth metal salts by reaction with the equivalent amount of alkali or alkaline earth metal hydroxide or carbonate. The salts so formed are soluble in water and alcohol.

Other di-aryl oxazolidinediones can be prepared in a similar manner, by substituting in the foregoing example the ethyl ester of the corresponding α-substituted mandelic acid.

The 5,5-diphenyl and the other di-aryl oxazolidinediones do not possess the hypnotic and sedative properties which characterize the 5-alkyl-substituted compounds, for example. The di-aryl compounds, on the other hand, have valuable anticonvulsant properties. The efficient dose for such purposes is far less than a lethally toxic dose. The 5-substituted di-aryl compounds may be administered in the usual manner.

In view of the above, it will be seen that the several objects of the invention are achieved and other advantageous results attained.

As many changes could be made in the above methods and products without departing from the scope of the invention, it is intended that all matter contained in the above description shall be interpreted as illustrative and not in a limiting sense.

What is claimed is:

1. The alkali and alkaline earth metal salts of 5,5-diphenyl-2,4-oxazolidinedione, prepared for use as therapeutics.

2. The method of preparing a 5,5-di-aryl-substituted 2,4-oxazolidinedione which comprises reacting the ethyl ester of a mandelic acid substituted in the α-position by an aryl radical with urea.

3. The method of preparing a 5,5-di-aryl substituted 2,4-oxazolidinedione which comprises condensing urea with the ethyl ester of a mandelic acid substituted in the α-position by an aryl radical.

4. The method of preparing 5,5-di-aryl substituted 2,4-oxazolidinedione which comprises reacting urea with the ethyl ester of a mandelic acid substituted in the α-position by an aryl radical in the presence of a metal alcoholate.

5. The method of preparing 5,5-diphenyl-2,4-oxazolidinedione which comprises reacting ethyl benzilate with urea.

6. The method of preparing a 5,5-di-aryl-substituted 2,4-oxazolidinedione which comprises reacting an ester of a mandelic acid substituted in the α-position by an aryl radical with urea in the presence of a metal alcoholate.

ROGER W. STOUGHTON.